(12) United States Patent
Douglas et al.

(10) Patent No.: US 7,237,042 B2
(45) Date of Patent: Jun. 26, 2007

(54) MECHANISM FOR GENERATING A VIRTUAL IDENTIFIER

(75) Inventors: Chet R. Douglas, Bisbee, AZ (US); Francis R. Corrado, Newton, MA (US); Brian J. Skerry, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 10/697,540

(22) Filed: Oct. 29, 2003

(65) Prior Publication Data

US 2005/0097234 A1    May 5, 2005

(51) Int. Cl.
  *G06F 3/00* (2006.01)
(52) U.S. Cl. ............... 710/3; 710/8; 710/9; 710/10; 710/15
(58) Field of Classification Search .......... 710/3, 710/8, 9, 10, 1, 12; 709/220
  See application file for complete search history.

(56) References Cited

U.S. PATENT DOCUMENTS

| | | | |
|---|---|---|---|
| 5,787,012 A * | 7/1998 | Levitt | 716/1 |
| 5,828,899 A * | 10/1998 | Richard et al. | 710/8 |
| 6,070,222 A * | 5/2000 | Farmwald et al. | 711/105 |
| 6,484,173 B1 * | 11/2002 | O'Hare et al. | 707/9 |
| 6,684,209 B1 * | 1/2004 | Ito et al. | 707/9 |
| 6,895,453 B2 * | 5/2005 | Allen et al. | 710/33 |
| 2004/0078401 A1 * | 4/2004 | Hilton | 708/252 |
| 2005/0219975 A1 * | 10/2005 | Schneidereit et al. | 369/47.22 |

OTHER PUBLICATIONS

Hamer, John, "Hashing Revisited, Myths exposed, a new order revealed", Jun. 24-26, 2002, pp. 1-20.*

* cited by examiner

*Primary Examiner*—Kim Huynh
*Assistant Examiner*—Aurangzeb Hassan
(74) *Attorney, Agent, or Firm*—Blakely, Sokoloff, Taylor & Zafman LLP

(57) ABSTRACT

In one embodiment, a method is provided that may include generating, at least in part, an identifier to be associated with a group of devices. The group of devices may comprise at least two devices. The identifier may be generated, at least in part, based, at least in part, upon respective source identifiers identifying, at least in part, respective sources of the at least two devices. Of course, many modifications, variations, and alternatives are possible without departing from this embodiment.

18 Claims, 3 Drawing Sheets

MECHANISM FOR GENERATING A VIRTUAL IDENTIFIER

FIELD

This disclosure relates to identifier generation.

BACKGROUND

In one conventional data storage network, a computer node includes a host processor and a host bus adapter (HBA). The HBA communicates with a plurality of physical data storage devices in a redundant array of inexpensive disks (RAID). The data storage devices may be identified by respective unique world wide names (WWNs) that the HBA may use to identify the data storage devices in its communications with the data storage devices.

From the vantage point of a human user's management of, and interaction with the data storage arrangement, it may be desirable to consider the plurality of physical data storage devices as constituting a single logical or virtual data storage device. In order to facilitate the user's management of and interaction with such a logical or virtual data storage device, the HBA may generate a WWN to identify the logical or virtual data storage device that comprises the plurality of physical data storage devices. If the WWN generated by the HBA conflicts with the WWN of another physical, logical, or virtual device in the network, it may no longer be possible to uniquely identify the devices having the conflicting WWNs. Disadvantageously, this may have a deleterious effect on the network's performance and manageability.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
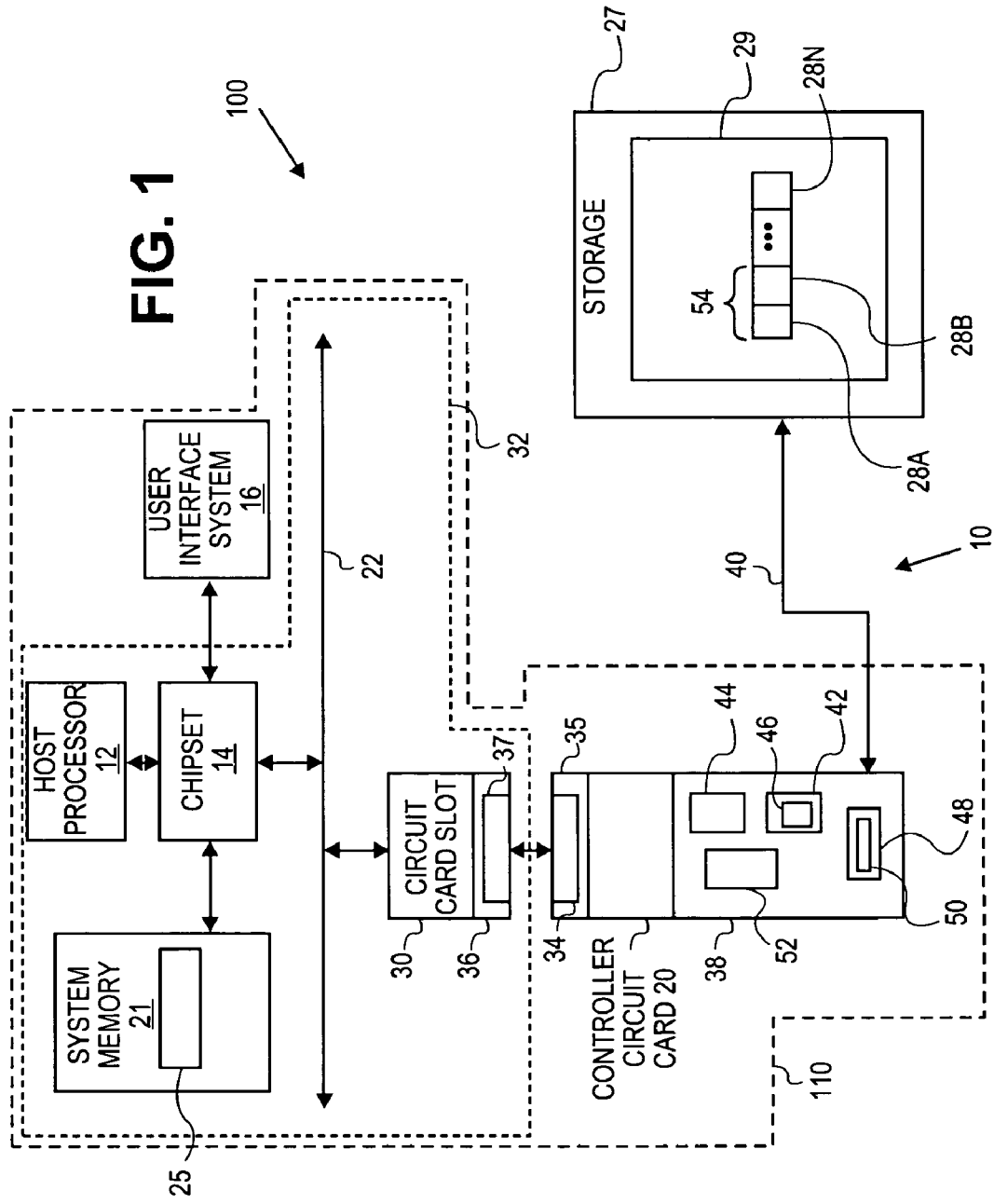
FIG. 1 is diagram that illustrates a system embodiment.

FIG. 1 illustrates a system embodiment 100. System 100 may include a host processor 12 coupled to a chipset 14. Host processor 12 may comprise, for example, an Intel® Pentium® IV microprocessor that is commercially available from the Assignee of the subject application. Of course, alternatively, host processor 12 may comprise another type of microprocessor, such as, for example, a microprocessor that is manufactured and/or commercially available from a source other than the Assignee of the subject application, without departing from this embodiment.

Chipset 14 may comprise a host bridge/hub system that may couple host processor 12, a system memory 21 and a user interface system 16 to each other and to a bus system 22. Chipset 14 may also include an input/output (I/O) bridge/hub system (not shown) that may couple the host bridge/bus system to bus 22. Chipset 14 may comprise one or more integrated circuit chips, such as those selected from integrated circuit chipsets commercially available from the assignee of the subject application (e.g., graphics memory and I/O controller hub chipsets), although one or more other integrated circuit chips may also, or alternatively be used, without departing from this embodiment. User interface system 16 may comprise, e.g., a keyboard, pointing device, and display system that may permit a human user to input commands to, and monitor the operation of, system 100.

Bus 22 may comprise a bus that complies with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). Alternatively, bus 22 instead may comprise a bus that complies with the PCI-X Specification Rev. 1.0a, Jul. 24, 2000, available from the aforesaid PCI Special Interest Group, Portland, Oreg., U.S.A. (hereinafter referred to as a "PCI-X bus"). Also alternatively, bus 22 may comprise other types and configurations of bus systems, including, for example, other or later developed versions of the PCI Express™ or PCI-X buses, without departing from this embodiment.

System embodiment 100 may comprise storage 27. Storage 27 may comprise RAID 29. RAID 29 may comprise a plurality of physical storage devices 28A, 28B, . . . 28N. Storage 27 may be communicatively coupled to operative circuitry 38 of circuit card 20 via one or more communication media 40. Each of the storage devices 28A, 28B, . . . 28N may comprise one or more respective mass storage devices. As used herein, the terms "storage" and "storage device" may be used interchangeably to mean one or more apparatus into, and/or from which, data and/or commands may be stored and retrieved, respectively. Also, as used herein, the term "mass storage device" means one or more storage devices capable of non-volatile storage of data and/or commands, and, for example, in this embodiment, may include, without limitation, one or more magnetic, optical, and/or semiconductor storage devices.

In this embodiment, card 20 may comprise, for example, an HBA. Of course, the number of storage devices 28A, 28B . . . 28N, and/or the number of communication media comprised in media 40 may vary without departing from this embodiment.

As used herein, a "communication medium" means a physical entity through which electromagnetic energy may be transmitted and/or received. When communicatively coupled together via one or more media 40, storage 27, circuitry 38, and host computer system 110 may together comprise a network 10.

The RAID level that may be implemented by RAID 29 may be 0, 1, or greater than 1. Depending upon, for example, the RAID level implemented in RAID 29, the number of mass storage devices comprised in storage devices 28A, 28B, . . . 28N may vary so as to permit the number of such mass storage devices to be at least sufficient to implement the RAID level implemented in RAID 29.

Processor 12, system memory 21, chipset 14, bus 22, and circuit card slot 30 may be comprised in a single circuit board, such as, for example, a system motherboard 32. Host computer system 110 may comprise system motherboard 32.

In this embodiment, operative circuitry 38 may exchange data and/or commands with storage 27, via one or more media 40 in accordance with, e.g., Serial Attached Small Computer Systems Interface (SAS) protocol, Small Computer Systems Interface (SCSI) protocol, Fibre Channel (FC) protocol, and/or iSCSI protocol. Of course, alternatively, circuitry 38 may exchange data and/or commands with storage 27 in accordance with other and/or additional communication protocols, without departing from this embodiment.

In accordance with this embodiment, if circuitry 38 and storage 27 exchange data and/or commands in accordance with FC protocol, the FC protocol may comply or be compatible with the protocol described in ANSI Standard Fibre Channel (FC) Physical and Signaling Interface-3 X3.303:1998 Specification (hereinafter, the "FC Specification"), and/or later-published versions and/or modifications of the FC Specification. If circuitry 38 and storage 27 exchange data and/or commands in accordance with SCSI protocol, the SCSI protocol may comply or be compatible with the interface/protocol described in American National Standards Institute (ANSI) Small Computer Systems Interface-2 (SCSI-2) ANSI X3.131-1994 Specification (hereinafter, the "SCSI Specification"), and/or later-published versions and/or modifications of the SCSI Specification. If circuitry 38 and storage 27 exchange data and/or commands in accordance with SAS protocol, the SAS protocol may comply or be compatible with the protocol described in "Information Technology—Serial Attached SCSI (SAS)," Working Draft American National Standard of International Committee For Information Technology Standards (IN-CITS) T10 Technical Committee, Project T10/1562-D, Revision 2b, published 19 Oct. 2002, by American National Standards Institute (hereinafter, the "SAS Standard") and/or later-published versions and/or modifications of the SAS Standard. If circuitry 38 and storage 27 exchange data and/or commands in accordance with iSCSI protocol, the iSCSI protocol may comply or be compatible with the protocol described in, Satran et al., "iSCSI," draft-ietf-ips-iscsi-20, Internet Draft, Internet Engineering Task Force, IP Storage Working Group, Jan. 19, 2003 (hereinafter, the "iSCSI Specification"), and/or later-published versions and/or modifications of the iSCSI Specification.

Depending upon, for example, whether bus 22 comprises a PCI Express™ bus or a PCI-X bus, circuit card slot 30 may comprise, for example, a PCI Express™ or PCI-X bus compatible or compliant expansion slot or interface 36. Interface 36 may comprise a bus connector 37 may be electrically and mechanically mated with a mating bus connector 34 that may be comprised in a bus expansion slot or interface 35 in circuit card 20.

As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry. In this embodiment, circuit card 20 may comprise operative circuitry 38. Circuitry 38 may comprise, for example, identifier generator circuitry 52, computer-readable memory 44, computer-readable memory 42, and counter circuitry 48.

Memory 44, memory 42, and system memory 21 each may comprise one or more of the following types of memories: semiconductor firmware memory, programmable memory, non-volatile memory, read only memory, electrically programmable memory, random access memory, flash memory, magnetic disk memory, and/or optical disk memory. Either additionally or alternatively, memory 44, memory 42, and/or system memory 21 may comprise other and/or later-developed types of computer-readable memory.

Machine-readable program instructions may be stored in memory 21 and memory 44. These instructions may be accessed and executed by operative circuitry 38 and/or processor 12. When executed by circuitry 38 and/or processor 12, these instructions may result in circuitry 38, processor 12, and/or system 110 performing the operations described herein as being performed by circuitry 38, processor 12, and/or system 110.

Slot 30 and card 20 may be constructed to permit card 20 to be inserted into slot 30. When card 20 is properly inserted into slot 30, connectors 34 and 36 may become electrically and mechanically coupled to each other. When connectors 34 and 36 are so coupled to each other, circuitry 38 becomes electrically coupled to bus 22 and may exchange data and/or commands with system memory 21, host processor 12, and/or user interface system 16 via bus 22 and chipset 14.

Alternatively, without departing from this embodiment, operative circuitry 38 may not be comprised in card 20, but instead, may be comprised in other structures, systems, and/or devices. These other structures, systems, and/or devices may be, for example, comprised in motherboard 32, coupled to bus 22, and exchange data and/or commands with other components (such as, for example, system memory 21, host processor 12, and/or user interface system 16) in system 100. For example, without departing from this embodiment, some or all of circuitry 38 may be comprised in one or more integrated circuits comprised in chipset 14.

In this embodiment, counter circuitry 48 may be capable of determining an activation time and of maintaining value 50 may indicate and/or specify that time. For example, in this embodiment, circuitry 48 may be capable of counting the number of seconds that elapse after the last most recent restarting and/or resetting of circuitry 38, system 100, and/or system 110. Circuitry 48 may maintain and store value 50 in not shown computer-readable memory comprised in circuitry 48. At any given time, value 50 may be equal to the number of seconds that have currently elapsed after this last most recent restarting and/or resetting of circuitry 38, system 100, and/or system 110.

Figure 2:
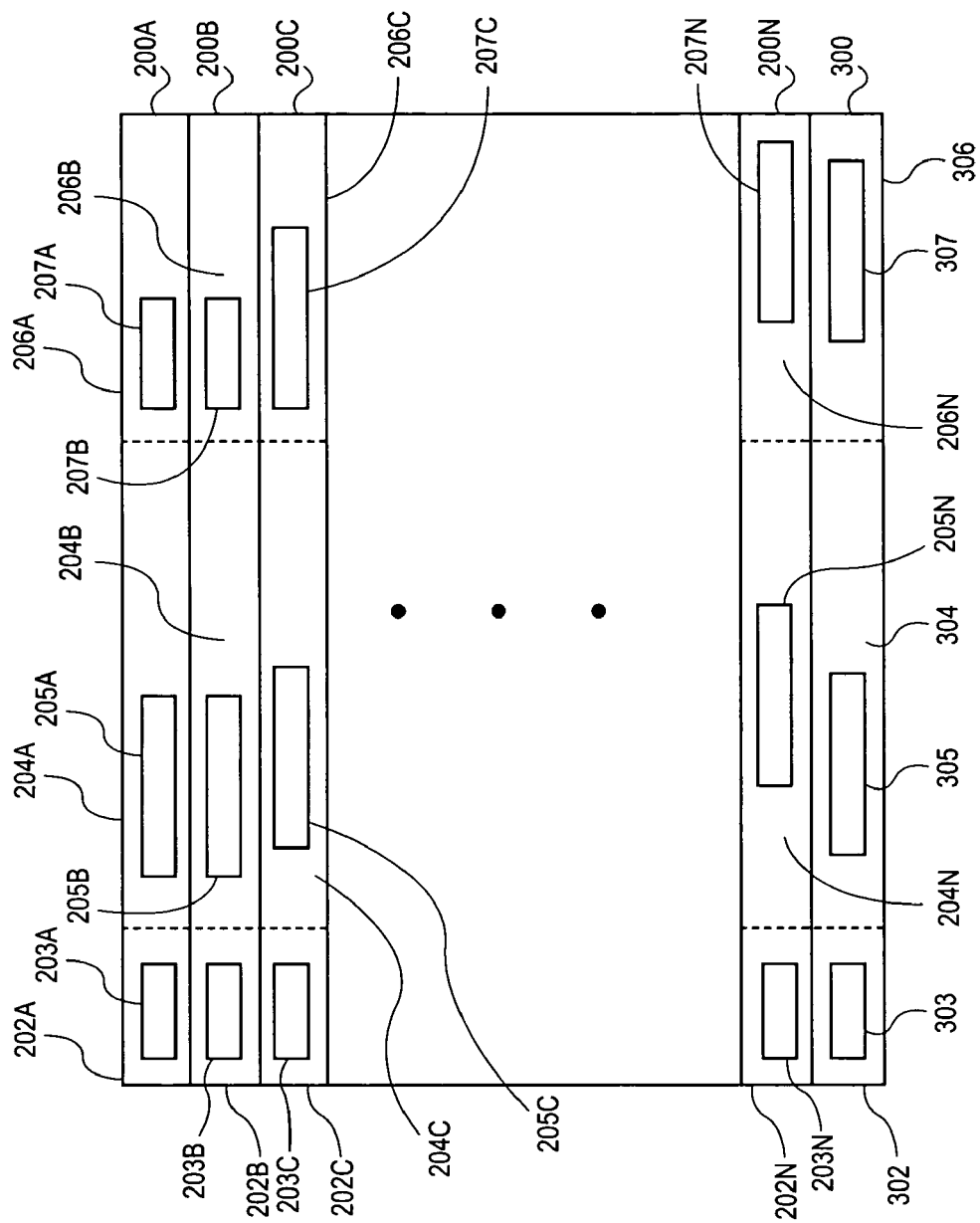
FIG. 2 illustrates identifiers according to an embodiment.

In this embodiment, operative circuitry 38 may store and maintain in memory 42 table 46. As shown in FIG. 2, table 46 may contain identifiers 200A, 200B, 200C . . . 200N of storage devices 28A, 28B, . . . 28N, and/or other physical, logical, and/or virtual devices in system 100. As used herein, "identifier" means one or more strings, values, and/or symbols capable of being used to identify, at least in part, one or more physical, logical, and/or virtual devices, and/or one or more groups of such devices.

In this embodiment, each of these identifiers 200A, 200B, 200C, . . . 200N may be or comprise a respective WWN in accordance with, for example, FC protocol, SAS protocol, and/or iSCSI protocol. Alternatively or additionally, depending upon, for example, the one or more communication protocols in accordance with which circuitry 38 may exchange data and/or commands with storage 27, one or more of identifiers 200A, 200B, 200C, . . . 200N may comprise, for example, a medium access control (MAC) address that may comply or be compatible with, for example, an Ethernet protocol that may comply or be compatible with the protocol described in Institute of Electrical and Electronics Engineers, Inc. (IEEE) Std. 802.3, published on Oct. 20, 2000. Of course, the number and types of identifiers and/or WWNs in table 46 may vary without departing from this embodiment.

In this embodiment, each of the identifiers 200A, 200B, 200C . . . 200N may comprise a respective plurality of fields. Each of these fields may contain a respective numerical value. For example, in this embodiment, identifier 200A may comprise fields 202A, 204A, 206A that may contain numerical values 203A, 205A, 207A, respectively; identifier 200B may comprise fields 202B, 204B, 206B that may contain numerical values 203B, 205B, 207B, respectively; identifier 200C may comprise fields 202C, 204C, 206C that may contain numerical values 203C, 205C, 207C, respectively; and, identifier 200N may comprise fields 202N, 204N, 206N that may contain numerical values 203N, 205N, 207N, respectively.

In this embodiment, depending upon, for example, the type of identifiers that may be stored in table 46, values 203A, 203B, 203C, and 203N may be or comprise respective IEEE Naming Assignment Authority (NAA) assigned WWN type values, for example, that may be compatible and/or in compliance with IEEE Std. 802, published 1990 (hereinafter the "IEEE Standard"). Also in this embodiment, depending upon, for example, the identifiers 200A, 200B, 200C, . . . 200N that may be stored in table 46, values 205A, 205B, 205C, . . . 205N may be or comprise WWN company identification numbers that may identify the manufacturer (e.g., manufacturing company) of the devices identified by identifiers 200A, 200B, 200C, . . . 200N. Additionally, in this embodiment, depending upon, for example, the identifiers 200A, 200B, 200C, . . . 200N that may be stored in table 46, values 207A, 207B, 207C, . . . 207N may be or comprise source identifiers of the devices identified by identifiers 200A, 200B, 200C, . . . 200N. As used herein, a "source identifier" means one or more strings, values, and/or symbols that may be capable of being used to identify, at least in part, at least one source and/or origin of one or more physical, logical, and/or virtual devices, and/or one or more groups of such devices. For example, in this embodiment, values 207A, 207B, 207C, . . . 207N may be or comprise WWN vendor identification numbers that may uniquely identify, at least in part, vendors of the devices identified by identifiers 200A, 200B, 200C, . . . 200N. Of course, depending upon the identifiers 200A, 200B, 200C, . . . 200N in table 46, the values 203A, 205A, 207A, 203B, 205B, 207B, 203C, 205C, 207C, 203N, 205N, and 207N that may be comprised in identifiers 200A, 200B, 200C, . . . 200N may differ without departing from this embodiment.

One or more program processes 25, such as, for example, one or more operating system processes, may reside in memory 21 and be executed by processor 12. The execution of these one or more processes 25 may permit and/or facilitate, for example, a human user (not shown) to control and monitor, using system 16, operation of storage 27 and circuitry 38.

Figure 3:
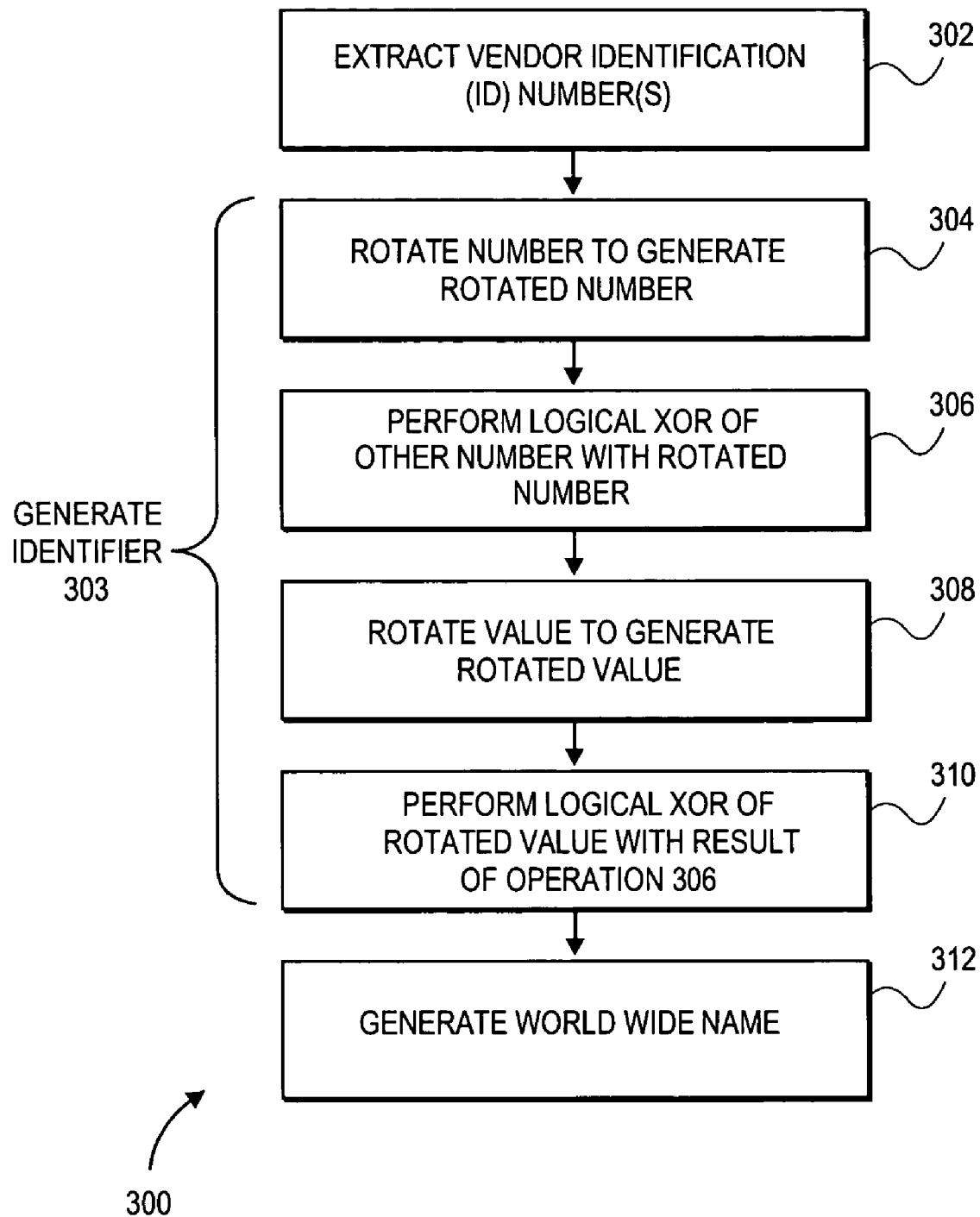
FIG. 3 is a flowchart that illustrates operations that may be performed according to an embodiment.

With reference now being made to FIG. 3, operations 300 that may be performed in system 100 in accordance with an embodiment will be described. After, for example, a reset and/or restart of circuitry 38, system 100, and/or system 110, the execution of one or more processes 25 by processor 12 may result in processor 12 requesting, at least in part, that circuitry 38 generate an identifier that may identify a logical and/or virtual device that may represent and/or comprise all or at least one or more respective portions of a group of two or more devices, for example, in order to facilitate the ability of the human user of system 100 to control and/or manage RAID 29. For example, processor 12 may request that circuitry 38 generate an identifier that may identify a logical and/or virtual storage device that may comprise a group 54 of physical storage devices 28A and 28B in RAID 29.

In response, at least in part, to this request from processor 12, circuitry 38 may signal circuitry 52. This may result in circuitry 52 extracting from one or more WWNs identifying, at least in part, one or more of devices 28A and 28B one or more vendor identification numbers, as illustrated by operation 302 in FIG. 3. For example, in this embodiment, identifiers 200A and 200B may be or comprise WWNs identifying devices 28A and 28B in group 54, and source identifiers 207A and 207B may be or comprise vendor identification numbers identifying the respective vendors of devices 28A and 28B. In this example, as part of operation 302, circuitry 52 may extract these vendor identification numbers from identifiers 200A and 200B.

Thereafter, in this embodiment, based at least in part upon source identifiers 207A and 207B and/or the vendor identification numbers comprised in source identifiers 207A and 207B, circuitry 52 may generate, at least in part, an identifier to be associated with group 54 of devices 28A and 28B, as illustrated by operation 303 in FIG. 3. Thereafter, as illustrated by operation 312, circuitry 54 may generate, at least in part, a WWN to be associated with group 54 of devices 28A and 28B, based at least in part upon the identifier generated, at least in part, as a result of operation 303. Thereafter, circuitry 38 may store in table 46 the WWN generated, at least in part, as a result of operation 312, and circuitry 38 may provide this WWN to processor 12. This WWN may be used by one or more processes 25 and/or circuitry 38 to identify a logical and/or virtual device that may represent and/or comprise group 54 of devices 28A and 28B.

For example, in this embodiment, as part of operation 303, circuitry 52 may rotate, by a predetermined, random, or pseudorandom number of bits, one of the two vendor identification numbers 207A and 207B that may be extracted as a result of operation 302 (e.g., in this embodiment, the vendor identification number of the second WWN appearing in table 46 of a device comprised in group 54, such as, for example, vendor identification number 207B) to generate a rotated number, as illustrated by operation 304 in FIG. 3. Thereafter, also as part of operation 303, circuitry 52 may perform, as illustrated by operation 306, a logical exclusive or (XOR) operation of the other of vendor identification numbers 207A and 207B (e.g., in this embodiment, the vendor identification number of the first WAN appearing in table 46 of a device comprised in group 54, such as, for example, vendor identification number 207A) with the rotated number generated as a result of operation 304, to produce a resulting value. Of course many variations are possible without departing from this embodiment.

In this example, group 54 comprises only devices 28A and 28B. However, although not shown in the Figures, if, alternatively, group 54 comprises one or more additional physical devices, operations 300 may comprise additional operations. For example, if group 54 comprises an additional physical device identified by identifier 200C (see FIG. 2), operations 300 may comprise an additional operation in which circuitry 52 may rotate vendor identification number 207C by a predetermined, random, or pseudorandom number of bits, and may perform a logical XOR of the resulting value generated as a result of operation 306 with the result of the rotation of vendor identification number 207C. In like manner, if, further alternatively, yet additional physical devices are comprised in group 54, additional iterations of these additional operations may be performed by circuitry 52, with the respective additional iterations being directed to rotating the respective vendor identification numbers of the WWNs of these yet additional physical devices, and performing additional respective logical XOR operations involving the respective results of the most recently preceding logical XOR operation iteration with the result of the most recently rotated vendor identification number. In this alternative arrangement, circuitry 52 may perform, as operation 310 discussed below, a logical XOR of the final resulting value from completing all of these additional operations and iterations, instead of the resulting value resulting from operation 306, with the rotated value generated as a result of operation 308.

Returning to the previous example, after operation 306 has been performed, also as part of operation 303, circuitry 52 may obtain value 50 from circuitry 48, and circuitry 52 may rotate value 50 by a predetermined, random, or pseudorandom number of bits, to generate a rotated value, as illustrated by operation 308. Also as part of operation 303, as illustrated by operation 310, circuitry 52 may perform a logical XOR of this rotated value resulting from operation 308, with the resulting value resulting from operation 306. In this embodiment, the output value resulting from this logical XOR may be used as an identifier to be associated with group 54.

For example, in this embodiment, circuitry 52 may generate, based at least in part, upon this identifier generated as a result of operation 310, a WWN 300 (see FIG. 2) to be associated with group 54, as illustrated by operation 312. WWN 300 generated as a result of operation 312 may comprise, for example, fields 302, 304, and 306, that may contain a NAA WWN type value 303, WWN company identification number 305, and identifier 307, respectively. Value 303 may be equal to at least one of the NAA WWN type values 203A and 203B in at least one of the identifiers 200A and 200B. Number 305 may be equal to or comprise the identifier generated as a result of operation 310. Thus, as part of operation 312, circuitry 52 may concatenate value 303, number 305, and identifier 307, and circuitry 38 may store the resulting concatenation in table 46 as WWN 300. Circuitry 38 may provide WWN 300 to processor 12. WWN 300 may be used by one or more processes 25 and/or circuitry 38 to identify a logical and/or virtual device that may represent and/or comprise group 54 of devices 28A and 28B.

In this embodiment, as a result, at least in part, of generating, identifier 306 and WWN 300, based at least in part upon unique vendor identification numbers 207A and 207B, and the results of operations 304, 306, 308, and 310, it may be highly improbable that the identifier 306 and WWN 300 generated as a result of operation 303 and 312, respectively, may be identical to any other vendor identification number and WWN used in system 100 or network 40. Advantageously, this reduces the probability that WWN 300 may conflict with the WWN of another physical, logical, or virtual device in system 100 or network 40. Additionally, as a result of operations 308 and 310, in this embodiment, identifier 306 and WWN 300 may be generated based at least in part upon a rotation of a value indicative of an activation time of system 100, circuitry 38, and/or system 110. Advantageously, this increases the probability that, even if the same physical device is comprised in two or more groups of devices for which identifiers and/or WWNs are generated in accordance with this embodiment, these WWNs will not conflict with the WWN of another physical, logical, or virtual device in system 100 or network 40.

Thus, one system embodiment may comprise a circuit board comprising a circuit card slot and a circuit card capable of being inserted into the slot. The circuit card may comprise circuitry to generate, at least in part, an identifier to be associated with a group of two or more devices. The circuitry may be capable of generating, at least in part, the identifier based, at least in part, upon respective source identifiers identifying of the at least two devices.

Without departing from this embodiment, one or more of the operations comprised in operations 300 may be carried out, at least in part, by circuitry, one or more software processes, or a combination of circuitry and one or more software processes. Many modifications are possible without departing from this embodiment.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
retrieving a first vendor identifier (ID) from a table;
retrieving a second vendor ID from the table; and
generating a virtual ID by randomizing the first vendor ID and the second vendor ID, including:
rotating the first vendor ID and the second vendor ID by a predetermined amount to form a rotated ID; and
performing a logical exclusive-or of the rotated ID with a predetermined number retrieving a value from a counter;
rotating the counter value to form a rotated counter value;
performing a logical exclusive-or of the rotated counter value with the virtual ID and associating the virtual ID with a group of at least two devices.

2. The method of claim 1, wherein the counter value is based-upon an activation time.

3. A method comprising:
retrieving a first vendor identifier (ID) from a table;
retrieving a second vendor ID from the table; and
generating a virtual ID by randomizing the first vendor ID and the second vendor ID;
retrieving a third vendor ID from the table;
rotating the third vendor ID by a predetermined amount to form a second rotated ID; and
performing a logical exclusive-or of the second rotated ID with the virtual ID and associating the virtual ID with a group of at least two devices.

4. The method of claim 3, further comprising:
extracting the first vendor ID from a world wide name identifying a first device; and
extracting the second vendor ID from a world wide name identifying a second device.

5. The method of claim 4, wherein: the first device and the second device comprise physical devices.

6. The method of claim 1, wherein the counter is incremented using a timer routine.

7. An apparatus comprising:
a table to store two or more vendor identifiers (IDs); and
circuitry to retrieve a second vendor ID from the table; and
circuitry to retrieve a first vendor ID and a second vendor ID from the table and to generate a virtual ID by randomizing the first vendor ID and the second vendor ID;
circuitry to rotate the first vendor ID and the second vendor ID by a predetermined amount to form a rotated ID and perform a logical exclusive-or of the rotated ID with a predetermined number; and
circuitry to retrieve a value from a counter, rotates the counter value to form a rotated counter value and performs a logical exclusive-or of the rotated counter value with the virtual ID and associating the virtual ID with a group of at least two devices.

8. The apparatus of claim 7, wherein the counter value is based upon an activation time.

9. An apparatus comprising
a table to store two or more vendor identifiers (IDs); and
circuitry to retrieve a second vendor ID from the table; and
circuitry to retrieve a first vendor ID and a second vendor ID from the table and to generate a virtual ID by randomizing the first vendor ID and the second vendor ID; and
circuitry to retrieve a third vendor ID from the table, rotates the third vendor ID by a predetermined amount to form a second rotated ID and performs a logical exclusive-or of the second rotated ID with the virtual ID and associating the virtual ID with a group of at least two devices.

10. The apparatus of claim 9, wherein: the circuitry is also capable of extracting the first vendor ID from a world wide name identifying a first device; and extracting the second vendor ID from a world wide name identifying a second device.

11. The apparatus of claim 10, wherein the first device and the second device comprise physical devices.

12. The apparatus of claim 7, wherein the counter is incremented using a timer routine.

13. An article comprising:
retrieving a first vendor identifier (ID) from a table;
retrieving a second vendor ID from the table; and
generating a virtual ID by randomizing the first vendor ID and the second vendor ID, including:
rotating the first vendor ID and the second vendor ID by a predetermined amount to form a rotated ID; and
performing a logical exclusive-or of the rotated ID with a predetermined number retrieving a value from a counter;
rotating the counter value to form a rotated counter value; and
performing a logical exclusive-or of the rotated counter value with the virtual ID and associating the virtual ID with a group of at least two devices.

14. The article of claim 13, wherein the counter value is based upon an activation time.

15. The article of claim 13, wherein the instructions when executed also result in:
retrieving a third vendor ID from the table;
rotating the third vendor ID by a predetermined amount to form a second rotated ID;
performing a logical exclusive-or of the second rotated ID with the virtual ID.

16. The article of claim 13, wherein the instructions when executed also result in: extracting the first vendor ID from a world wide name identifying a first device; and
extracting the second vendor ID from a world wide name identifying a second device.

17. The article of claim 16, wherein: the first device and the second device comprise physical devices.

18. The article of claim 13, wherein the counter is incremented using a timer routine.

* * * * *

UNITED STATES PATENT AND TRADEMARK OFFICE
CERTIFICATE OF CORRECTION

PATENT NO. : 7,237,042 B2 Page 1 of 1
APPLICATION NO. : 10/697540
DATED : June 26, 2007
INVENTOR(S) : Douglas et al.

It is certified that error appears in the above-identified patent and that said Letters Patent is hereby corrected as shown below:

Column 6, at line 41, delete "WAN" and insert --WWN--.

Signed and Sealed this

Twenty-ninth Day of April, 2008

JON W. DUDAS
*Director of the United States Patent and Trademark Office*